United States Patent
Madden et al.

(10) Patent No.: US 10,867,217 B1
(45) Date of Patent: Dec. 15, 2020

(54) FUSION OF VISUAL AND NON-VISUAL INFORMATION FOR TRAINING DEEP LEARNING MODELS

(71) Applicant: ObjectVideo Labs, LLC, Tysons, VA (US)

(72) Inventors: Donald Madden, Columbia, MD (US); Narayanan Ramathan, Chantilly, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 189 days.

(21) Appl. No.: 16/121,067

(22) Filed: Sep. 4, 2018

Related U.S. Application Data

(60) Provisional application No. 62/553,174, filed on Sep. 1, 2017.

(51) Int. Cl.
*G06K 9/62* (2006.01)
*H04N 7/18* (2006.01)
(Continued)

(52) U.S. Cl.
CPC .......... *G06K 9/6288* (2013.01); *G06K 9/033* (2013.01); *G06K 9/6257* (2013.01); *G06T 7/20* (2013.01);
(Continued)

(58) Field of Classification Search
CPC ....... G06K 2009/6213; G06K 9/00677; G06K 9/00711; G06K 9/46; G06K 9/4671;
G06K 9/6212; G06K 9/6218; G06K 9/6267; G06K 2009/3291; G06K 9/3241; G06K 9/4628; G06K 9/46288; G06K 9/46289;
(Continued)

(56) References Cited

U.S. PATENT DOCUMENTS 6,658,091 B1 * 12/2003 Naidoo .................. H04M 11/04
379/37
9,652,695 B2 5/2017 Bengio et al.
(Continued)

OTHER PUBLICATIONS

Takaya et al. "Tracking Moving Objects in a Video Sequence by the Neural Network Trained for Motion Vectors" 2005 IEEE, 4 pages.*
Amato et al. "Neural Network Based Video Surveillance System" 2005 IEEE, 5 pages.*

*Primary Examiner* — Nathnael Aynalem
(74) *Attorney, Agent, or Firm* — Fish & Richardson P.C.

(57) ABSTRACT

A computer-implemented method includes obtaining data from one or more non-visual sensors and a camera from a first monitoring system. The data includes non-visual data from the non-visual sensors and visual data obtained from the camera. The non-visual data from the non-visual sensors are paired with corresponding visual data from the camera. Data points of the non-visual data are synchronized with frames of the visual data based on a likelihood of an event indicated in the non-visual data. The synchronized data points of the non-visual data with the frames of the visual data are provided as labeled input to a neural network to train the neural network to detect the event. The trained neural network is provided to one or more cameras corresponding to one or more additional monitoring systems to detect the event in the visual data obtained by the one or more cameras.

21 Claims, 3 Drawing Sheets

(51) Int. Cl.
*G06T 7/20* (2017.01)
*G06K 9/03* (2006.01)

(52) U.S. Cl.
CPC ......... *H04N 7/181* (2013.01); *G06K 2209/27* (2013.01); *G06T 2207/10016* (2013.01); *G06T 2207/20076* (2013.01); *G06T 2207/20081* (2013.01); *G06T 2207/20084* (2013.01); *G06T 2207/30168* (2013.01); *G06T 2207/30232* (2013.01)

(58) Field of Classification Search
CPC ........ G06K 9/629; G06N 20/00; H04N 7/181; H04N 7/188; H04N 5/23206; H04N 21/6125; H04N 21/6175; H04N 7/18; H04N 7/185; H04N 21/4227; H04N 5/23203; H04M 3/10
USPC ......... 348/143, 152–154, 159, 169; 340/506, 340/541; 382/159, 224
See application file for complete search history.

(56) References Cited

U.S. PATENT DOCUMENTS

| | | |
|---|---|---|
| 9,704,054 B1 | 7/2017 | Tappen et al. |
| 10,185,892 B1* | 1/2019 | Mishra ..................... G06K 9/66 |
| 2005/0174229 A1* | 8/2005 | Feldkamp ........ G08B 13/19695 340/506 |
| 2007/0139192 A1* | 6/2007 | Wimberly ........ G08B 13/19697 340/539.22 |
| 2007/0279214 A1* | 12/2007 | Buehler ........... G08B 13/19645 340/521 |
| 2011/0058034 A1* | 3/2011 | Grass ....................... H04N 7/18 348/143 |
| 2013/0120138 A1* | 5/2013 | Hicks, III .............. G08B 25/08 340/538 |
| 2016/0292881 A1* | 10/2016 | Bose ................... G06K 9/00711 |
| 2017/0109582 A1 | 4/2017 | Kuznetsova et al. |
| 2017/0118539 A1* | 4/2017 | Lokshin ............... G06K 9/4628 |

* cited by examiner

300

```
┌─────────────────────────────────────────────────────────────┐
│ OBTAINING DATA FROM ONE OR MORE NON-VISUAL SENSORS AND A    │
│ CAMERA FROM A FIRST MONITORING SYSTEM                       │
│                                                         302 │
└─────────────────────────────────────────────────────────────┘
                              │
                              ▼
┌─────────────────────────────────────────────────────────────┐
│ BASED ON THE OBTAINED DATA FROM THE ONE OR MORE NON-VISUAL  │
│ SENSORS AND THE CAMERA, PAIRING THE NON-VISUAL DATA FROM THE│
│ ONE OR MORE NON-VISUAL SENSORS WITH CORRESPONDING VISUAL    │
│ DATA FROM THE CAMERA                                    304 │
└─────────────────────────────────────────────────────────────┘
                              │
                              ▼
┌─────────────────────────────────────────────────────────────┐
│ BASED ON THE PAIRING FROM THE NON-VISUAL DATA FROM THE NON- │
│ VISUAL SENSORS WITH THE CORRESPONDING DATA FROM THE CAMERA, │
│ SYNCHRONIZING ONE OR MORE DATA POINTS OF THE NON-VISUAL DATA│
│ WITH ONE OR MORE FRAMES OF THE VISUAL DATA BASED ON A       │
│ LIKELIHOOD OF AN EVENT INDICATED IN THE NON-VISUAL DATA     │
│                                                         306 │
└─────────────────────────────────────────────────────────────┘
                              │
                              ▼
┌─────────────────────────────────────────────────────────────┐
│ PROVIDING THE SYNCHRONIZED ONE OR MORE DATA POINTS OF THE   │
│ NON-VISUAL DATA WITH THE ONE OR MORE FRAMES OF THE VISUAL   │
│ DATA AS LABELED INPUT TO A NEURAL NETWORK TO TRAIN THE      │
│ NEURAL NETWORK TO DETECT THE EVENT                          │
│                                                         308 │
└─────────────────────────────────────────────────────────────┘
                              │
                              ▼
┌─────────────────────────────────────────────────────────────┐
│ PROVIDING THE TRAINED NEURAL NETWORK TO ONE OR MORE CAMERAS │
│ CORRESPONDING TO ONE OR MORE ADDITIONAL MONITORING SYSTEMS  │
│ TO DETECT THE EVENT IN THE VISUAL DATA OBTAINED BY THE ONE  │
│ OR MORE CAMERAS                                         310 │
└─────────────────────────────────────────────────────────────┘
```

FUSION OF VISUAL AND NON-VISUAL INFORMATION FOR TRAINING DEEP LEARNING MODELS

CROSS-REFERENCE TO RELATED APPLICATION

This application claims the benefit of U.S. Provisional Application No. 62/553,174 filed Sep. 1, 2017, and titled "Fusion of Visual and Non-Visual Information for Training Deep Learning Models," which is incorporated here by reference.

TECHNICAL FIELD

The subject matter of the present disclosure is generally related to object classification, and more particularly, to object classification using neural networks.

BACKGROUND

Objects may be detected and classified in images through image recognition. For example, a computer may recognize that pixels in an image represent a person. Such image recognition techniques may use deep learning neural network models, window-based detection, and leveraging internet data, to name a few examples. For instance, the deep learning neural network models may be trained with labeled imagery data in order to detect and classify objects in images.

SUMMARY

The subject matter of the present disclosure is related to techniques of training a neural network model to accurately extract information from an image or video in a security context. Specifically, the security context may be an integrated security environment that monitors a property, such as a residential or commercial facility, with a monitor control unit. The monitor control unit obtains non-visual data from each of the one or more sensors to determine whether the non-visual data includes a likelihood that an object, such as a vehicle, a human, or a pet, has been detected or that object movement has been detected. In addition, the monitor control unit obtains visual data from one or more cameras located in the facility. The visual data may be recording an area monitored by the one or more sensors. The monitor control unit provides the sensory data and the camera footage to a data collection system.

The data collection system obtains the non-visual data and the visual data from the monitored property. The data collection system pairs and synchronizes the non-visual data with the visual data in order to label the visual data as having a likelihood of showing an object or object movement or non-movement. The data collection system trains a neural network model with the labeled camera footage. Once the data collection system sufficiently trains the neural network model to detect accurate object movement or objection identification with non-visual and visual data, the data collection system may provide the trained neural network model to other facilities that include cameras to use only visual data to detect objects. The cameras in each monitored property can use the trained neural network model to perform object identification or object movement in camera footage without the use of sensors providing a likelihood of object detection or object movement. Additionally, the cameras in each monitored property may transmit video to an external server that includes the trained neural network to process the camera footage to determine a likelihood of object detection or object movement.

In one general aspect, a method is performed by one or more computers of a monitoring system. The method includes: obtaining data from one or more non-visual sensors and a camera from a first monitoring system, wherein the data includes non-visual data from the non-visual sensors and visual data obtained from the camera; based on the obtained data from the one or more non-visual sensors and the camera, pairing the non-visual data from the one or more non-visual sensors with corresponding visual data from the camera; based on the pairing from the non-visual data from the non-visual sensors with the corresponding data from the camera, synchronizing one or more data points of the non-visual data with one or more frames of the visual data based on a likelihood of an event indicated in the non-visual data; providing the synchronized one or more data points of the non-visual data with the one or more frames of the visual data as labeled input to a neural network to train the neural network to detect the event; and providing the trained neural network to one or more cameras corresponding to one or more additional monitoring systems to detect the event in the visual data obtained by the one or more cameras.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, the non-visual data from the one or more non-visual sensors includes data values provided by the non-visual sensors, timestamps corresponding to each of the data values, a device ID corresponding to each of the non-visual sensors that provided the data values, a string value of a location for each of the non-visual sensors, and a string value for a type of the non-visual sensors; and the visual data from the camera includes video stream data, a device ID of the camera that provided the video stream data, a timestamp of the video stream data, and data indicating a location of the camera in the first monitoring system.

In some implementations, the method further includes pairing the non-visual data from the one or more non-visual sensors with the corresponding visual data from the camera further includes: retrieving the non-visual data from the one or more non-visual sensors and the visual data from the camera from a sensor database; filtering the data from the one or more non-visual sensors based on a type of the detection, wherein the data from the one or more non-visual sensors comprises weight data, motion sensor data, and seismic data, by: determining one or more overlapping time ranges of data from the one or more non-visual sensors that each indicate a detection of movement; in response to determining the one or more overlapping time ranges of data from the one or more non-visual sensors that each indicate the detection of movement, comparing the overlapping time ranges of data from the one or more non-visual sensors to time ranges of the visual data stored in the database; and in response to determining that one or more segments of time of the visual data fall within the overlapping time ranges of data from the one or more non-visual sensors, pairing the visual data of the one or more segments of time to the data from the one or more non-visual sensors with the overlapping time ranges.

In some implementations, the method further includes synchronizing the one or more data points of the non-visual data with the one or more frames of the visual data further includes: determining a resolution of a frame of the visual data; determining a brightness of the frame of the visual data; and determining a blurriness of the frame of the visual data.

In some implementations, the method further includes comparing the resolution of the frame of the visual data to a first threshold; comparing the brightness of the frame of the visual data to a second threshold; comparing the blurriness of the frame of the visual data to a third threshold; in response to determining the resolution of the frame falls within a first acceptable range of the first threshold, determining the brightness of the frame falls within a second acceptable range of the second threshold, and determining the blurriness of the frame falls within a third acceptable range of the third threshold, comparing the paired non-visual data corresponding to the frame of the visual data to a voltage threshold; and in response to determining the non-visual data exceeds the voltage threshold, labeling the frame of the visual data as object detected.

In some implementations, the method further includes in response to determining the non-visual data does not exceed the voltage threshold, labeling the frame of the visual data as not detected.

In some implementations, the method further includes the trained neural network model is an object detection model trained using a mixture of data indicating when a movement event occurred and data indicating a non-movement event occurred.

In some implementations, the method further includes receiving data indicating that the trained neural network model detected movement at the monitored property; providing data indicating to an owner of the monitored property that the trained neural network model has detected movement at the monitored property, wherein the data comprises real-time video feed of the detected movement; receiving, from a client device of the owner, data indicating that the trained neural network produced an error in detecting the movement at the monitored property, wherein the data comprises a notification from the owner indicating no movement in the real-time video feed, the real-time video feed, and data from the non-visual sensors that has timestamps corresponding to timestamps of the real-time video feed; and providing the real-time video feed and the data from the non-visual sensors received from the client device to the trained neural network model to update the trained neural network model for improved detection.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIG. 3 is a flowchart illustrating of an example process for training the neural network model to detect object identification and object movement.

Like reference numbers and designations in the various drawings indicate like elements.

DETAILED DESCRIPTION

Figure 1:
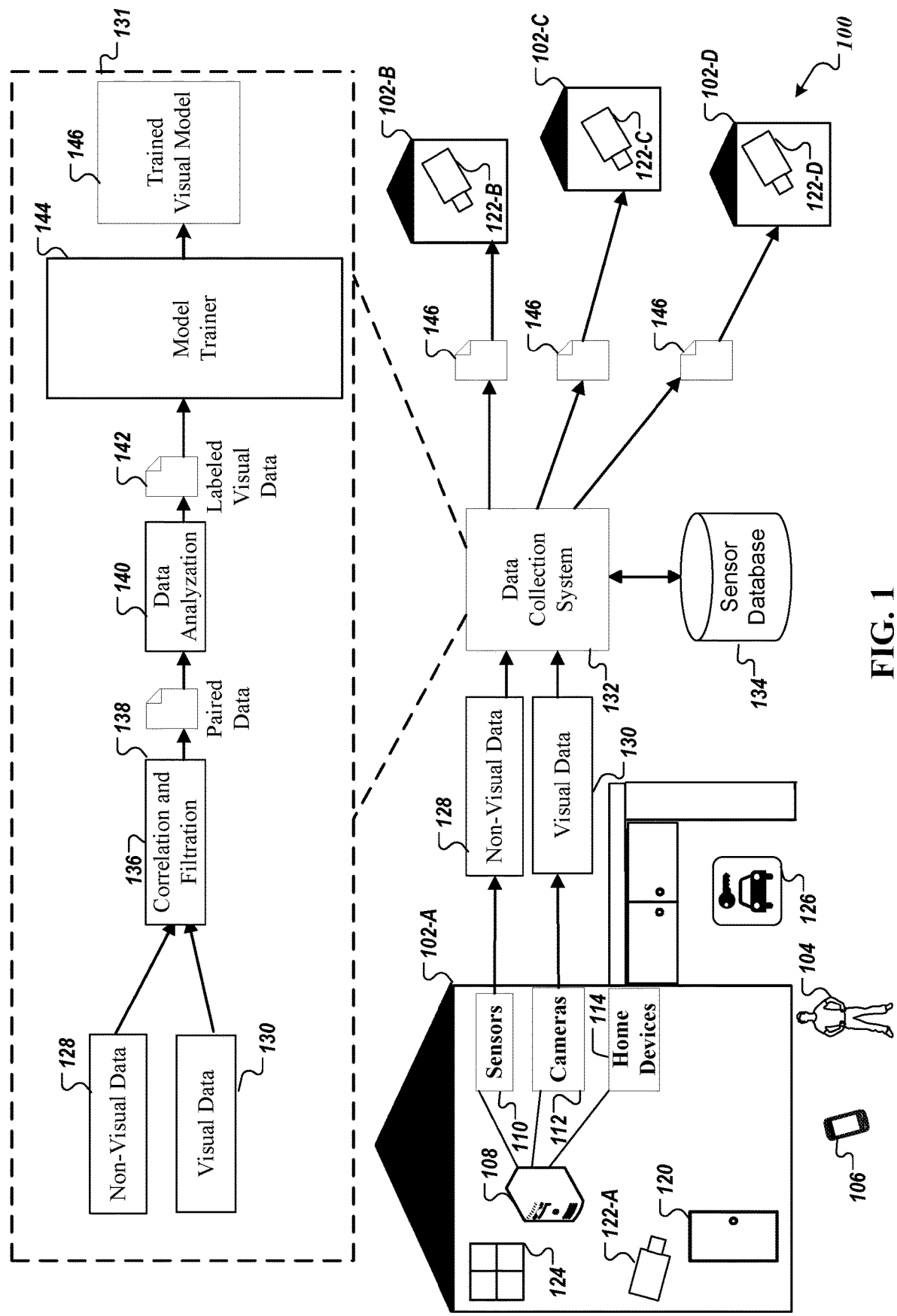
FIG. 1 is a contextual diagram of an example system of an integrated security environment that trains a neural network model using video and non-video data to detect objects and object movement.

FIG. 1 is a contextual diagram of an example system of an integrated security environment 100 that trains a deep learning model using video and non-video data to detect objects and object movement. Though system 100 is shown and described including a particular set of components including a monitor control unit 108, sensors 110, cameras 112, home devices 114, data collection system 132, sensor database 134, the present disclosure need not be so limited. For instance, in some implementations only a subset of the aforementioned components may be used by the integrated security environment 100 for training the neural network model. As an example, there may be implementations that do not use the home devices 114. Similarly, there may be implementations that the data collection system 132 is stored in the monitor control unit 108. Yet other alternative exemplary systems also fall within the scope of the present disclosure such as a system 100 that does not use a monitor control unit 108. For these reasons, the system 100 should not be viewed as limiting the present disclosure to any particular set of necessary components.

As shown in FIG. 1, a monitored property 102-A may be monitored by a monitor control unit 108 that includes components within the monitored property 102-A. The monitored property 102-A may be a residential facility, such as a home, a commercial facility, such as an office building, or a storage facility, such as a warehouse, to name a few examples. The components within the monitored property 102-A may include one or more sensors 110, one or more cameras 112, and one or more home devices 114. The one or more cameras 112 may include video cameras, such as video camera 122-A, that are located at the exterior of the monitored property 102-A near the front door 120, as well as located at the interior of the monitored property 102-A near the front door 120. The one or more sensors 110 may include a motion sensor located at the exterior of the monitored property 102-A, a front door sensor that is a contact sensor positioned at the front door 120, a pressure sensor that receives button presses at a light device, a lock sensor that is positioned at the front door 120 and each window 124, a passive infrared sensor (PIR) located at the interior of the monitored property 102-A, thermal sensors, depth sensors, infrared beam trip sensors, weight sensors, seismic sensors, inductive loop sensors such as vehicle detection loops, an RGB-D camera, and one or more light curtain sensors. Each of these sensors may be positioned in and around the monitored property 102-A for the monitor control unit 108 to rely on for monitoring purposes.

The contact sensor may sense whether the front door 120 or the windows 124 is in an open or closed position. The lock sensor may sense whether the front door 120 and each window 124 is in an unlocked or locked position. The one or more home devices 114 may include home appliances such as a washing machine, a dryer, a dishwasher, an oven, a stove, a microwave, and a laptop, to name a few examples. Additionally, should the monitored property 102-A be a commercial facility, the one or more home devices 114 may include a printer, a copier, a vending machine, and a fax machine to name a few examples.

The monitor control unit 108 communicates over a wired or wireless network connection with each of the one or more sensors 110, one or more cameras 112, and one or more home devices 114 (washing machine, a dryer, a dishwasher, an oven, a stove, a microwave, a laptop, etc.) to receive sensor data descriptive of events detected by the one or more sensors 110, the one or more cameras 112, and the one or more home devices 114 in the monitored property 102-A.

In some implementations, the connected devices may connect via Wi-Fi, Bluetooth, or any other protocol used to communicate over a network to the monitor control unit 108. Additionally, the monitor control unit 108 communicates over a long-range wired or wireless connection with the data collection system 132 over a network via one or more communication links. In some implementations, the data collection system 132 is located remotely from the monitored property 102-A, and manages the monitoring at the monitored property 102-A, as well as other (and, perhaps, many more) monitoring systems located at different monitored properties that are owned by various users. For example, other monitored properties such as monitored properties 102-B, 102-C, and 102-D. In other implementations, the data collection system 132 may be located locally at the monitored property 102-A. The data collection system 132 communicates bi-directionally with the monitor control unit 108. Specifically, the data collection system 132 receives sensor and video data descriptive of events detected by the sensors included in the monitoring system of the monitored property 102-A. Additionally, the data collection system 132 transmits instructions to the monitor control unit 108 for particular events.

In some implementations, the one or more sensors 110 may detect a presence or movement of an object, such as an individual, an animal, a vehicle, or an item, to name a few examples, at the monitored property 102-A. For example, the monitored property 102-A may include a weight sensor under a doormat behind the front door 120 to indicate a measurement of force applied downward on the doormat. For instance, the weight sensor may detect a change in weight that has been applied to the doormat when a user or a pet has stepped on the doormat. In another example, the monitored property 102-A may include one or more inductive loop sensors under a garage floor to detect a vehicle or movement of a vehicle, such as vehicle 126, entering or leaving a garage of the monitored property 102-A. The inductive loop sensors may detect a vehicle passing over which induces eddy currents in the inductive loop sensors, decreases inductance if the inductive loop sensors, which generates a pulse to provide as a likelihood of vehicle detection/movement. In another example, the monitored property 102-A may include one or more motion sensors that detect movement, such as a PIR motion sensor. The motion sensors provide a likelihood that motion has occurred in the motion sensors field of view, whether the motion come from a moving person, a moving animal, or a falling object. In another example, the monitored property 102-A may include one or more seismic sensors to measure seismic vibrations. In this instance, the one or more seismic sensors may be placed in the driveway, garage, or even a room of the monitored property 102-A to detect ground vibrations as a result of movement on top of the ground.

Each of the one or more sensors 110 provides data to the monitor control unit 108. In some implementations, the one or more sensors 110 may provide a continuous stream of data to the monitor control unit 108 indicating a likelihood of detection. The likelihood of detection may indicate object identification or object movement depending on the type of sensor providing the likelihood. For example, a weight sensor may provide object identification and a PIR sensor may provide object movement. In other implementations, the one or more sensors 110 may provide data to the monitor control unit 108 only when a sensor has tripped (i.e., a sensor indicates a strong likelihood of detection). The sensor that streams data to the monitor control unit 108 may provide data in the format of a voltage high, such as 3.3V, or a voltage low, such as 1.5V, depending on the likelihood of detection. For example, a high voltage value may indicate a likelihood of strong detection by the sensor and a low voltage value may indicate no detection. The sensor may additionally provide a timestamp to the monitor control unit 108 indicating at time at which the detection or non-detection has occurred.

In some implementations, the monitor control unit 108 cross-correlates data between multiple sensors. The cross-correlation of data from each of the one or more sensors 110 improves the detection accuracy of the monitor control unit 108. As further explained below, the cross-correlation of data will be used to train a deep learning model to recognize one or more objects in images alone.

In some implementations, the monitor control unit 108 receives a device ID number associated with each sensor along with the sensor data. For example, the weight sensor may provide to the monitor control unit 108 a device ID of 005 when the weight sensor is tripped. The motion sensor may provide to the monitor control unit 108 a device ID of 002 as the motion sensor provides data. The monitor control unit 108 may store a table of device IDs and associated sensor types. In some implementations, the monitor control unit 108 may tag the received data from the one or more sensors with the sensor type to indicate which sensor provided the data. This will be beneficial for generating the trained visual model 146 later.

In some implementations, the monitor control unit 108 may receive a continuous stream of video from the one or more cameras 112. The received video stream may be provided in real-time from each of the one or more cameras 112. For example, real-time can include the one or more cameras 112 providing a live video feed of actual events taking place as the one or more cameras 112 record video. Typically, the one or more cameras 112 transmit video into sequentially numbered packets for easy reassembly by the monitor control unit 108. Each packet transmitted by the one or more cameras 112 may also be time stamped and tagged with a device ID. The time stamping allows the monitor control unit 108 to cross correlate the video packets with the other one or more sensors 110. The device ID allows the monitor control unit 108 to determine which of the one or more cameras 112 provided the video packet. In addition, the monitor control unit 108 can determine a location of the one or more cameras 112 in the monitored property 102-A based on the identified device ID. For example, the monitor control unit 108 may receive a video packet from camera 122-A with a device ID of 010. The monitor control unit 108 may retrieve the device type from its device table and determine that device ID 010 is camera 122-A. The device table may also include a location of camera 122-A, such that it is located in the main foyer of the monitored property 102-A. If a property owner 104 moves the location of the camera 122-A, the property owner 104 may update the device table through an application displayed via the client device 106 that communicates with the data collection system 132.

In some implementations, the one or more cameras 112 may include one or more non-visual sensors in a field of view. For example, a weight sensor under a door-mat in front of front door 120 may be in the field of view of camera 122-A, which is located in the main foyer of the monitored property 102-A. The weight sensor under the door may occupy a particular region of pixels in the imagery provided by the camera 122-A. In some implementations, a user may manually input that a sensor exists in the region defined by the pixels in the imagery using a client device, such as client device 106. Alternatively, the system 100 may train a deep learning model to recognize a location of a sensor in imagery when a user interacts with the sensor. For example, a user may walk across the front door mat repeatedly to build a correspondence between an indication of weight in the imagery data.

In some implementations, the one or more cameras 112 may be focused on areas in the monitored property 102-A also monitored by the one or more sensors 110. For example, camera 122-A may be located in a corner of the main foyer of the monitored property 102-A focused on the front door 120 and its surrounding area. In this instance, a weight sensor may be located under a doormat in front of the front door 120 to detect weight on the door mat, a lock sensor may be placed at the door knob of the front door 120 to detect a change in the door knobs lock, and a motion sensor may be placed above the front door 120 to detect motion in close proximity to the door. In other examples, cameras may be placed elsewhere around the monitored property 102-A, such as in the garage, the basement, and in the living room, where one or more other sensors 110 currently monitor.

In some implementations, the monitor control unit 108 may provide data to the data collection system 132. The monitor control unit 108 may provide non-visual data 128 and visual data 130 to the data collection system 132 for generating an object detection model, such as trained visual model 146. In particular, when the one or more cameras 112 and the sensors 110 overlap in locations they monitor, such as a camera viewing a region of monitored property 102 that includes a weight sensor under a doormat, the accuracy of object detection improves. For instance, the high event detection using both data from the one or more cameras 112 and the one or more sensors 110 can be used as training data to create the object detection model.

In some implementations, the monitor control unit 108 may provide the non-visual data 128 and the visual data 130 throughout the day. In some implementations, the non-visual data 128 may include data provided by each of the one or more sensors 110. This data may include data values provided by the one or more sensors 110, timestamps associated with each of the data values, a device ID associated with each of the one or more sensors 110, a string value of an associated sensor location, and a string value of an associated sensor type. For example, non-visual data 128 may include data values from a PIR motion sensor that indicates a tripped sensor (e.g., data that indicates that the sensor has detected motion), a timestamp such as 9/1/2017 23:00:04, a device ID of 002, a sensor location of "FOYER," and a sensor type of "MOTION."

The monitor control unit 108 may provide this data as a packet to the data collection system 132. The monitor control unit 108 may also provide visual data 130 to the data collection system 132. The visual data 130 may include video stream in packet format provided by the one or more cameras 112, the device ID of the camera 112 that provided the video stream, a timestamp, and a location of the camera 112 in the monitored property 102. For example, one row of the visual data 130 may include a video stream in a video format such as mpeg, a device ID such as 006, a timestamp such as 9/2/2017 9:29:00, and "FOYER" as a string to represent a location of one of the cameras 112 in the monitored property 102-A. The monitor control unit 108 may provide the visual data 132 to the data collection system 132 in a manner similar as it provided the non-visual data 128.

The data collection system 132 may receive the non-visual data 128 and the visual data 130 to store in the sensor database 134. In some implementations, the sensor database 134 may include one or more data tables for each sensor type. The data collection system 132 may store the non-visual data 128 in a table of a similar sensor type. For example, the sensor database 134 may store data values from a weight sensor in one or more data tables for the weight sensor, data values from a motion sensor in one or more data tables for the motion sensor, etc. Each data table includes a column for a timestamp, a column for the data values, a column for the device ID, a column for a location of the sensor in the monitored property 102-A, and a column for a sensor type of the sensor. For example, one row of a weight sensor table may include: 9/28/2017 22:00:01 as a timestamp, 5 volts for the data values, 003 as the device ID, "IDENTIFICATION" as a string to represent type of sensor, and "FOYER" as a string to represent a location of the weight sensor in the monitored property 102-A. The data collection system 132 may store the non-visual data 128 from each of the other one or more sensors 110 in the sensor database 134 in a similar manner. Additionally, the data collection system 132 may store the visual data 130 in one or more data tables similar to the data tables of the non-visual data 128.

In some implementations, the data collection system 132 may use the data in the sensor database 134 to train an object detection model for object detection and object movement. The data collection system 132 may initiate training a model for object detection and object movement once sufficient sensor data has been stored in the sensor database 134. For example, if the sensor database 134 includes at least ten thousand entries for the weight sensor data tables, at least ten thousand entries for the motion sensor data tables, at least ten thousand entries for the seismic sensor data tables, and at least ten thousand entries for the visual data. The entries for the non-visual data 128 should include a sufficient mix of data obtained when an event occurred and data obtained when no event occurred. For example, at least five thousand of the ten thousand entries in the weight sensor data tables include data values that tripped the weight sensor and the other five thousand entries did not trip the weight sensor. Other examples for tripping and not tripping the weight sensor are also possible. Similarly, the same amount of data for tripping the sensors may apply to the motion sensor, the seismic sensor, and other non-visual sensors. In addition, a sufficient amount of visual data 130 should exist in the sensor database 134 before training a neural network model for object identification. The visual data 130 stored in the sensor database 134 should cover time ranges by entries stored for the non-visual data 128. For example, if the time ranges for the non-visual data 128 in the one or more database tables in the sensor database 134 covers a period between 9/1/2017 9:00:00 through 9/2/2017 9:00:00, then the time ranges for the visual data 130 should fall in a range that at least crosses the time period for the non-visual data 128, such as 9/1/2017 8:00:00 through 9/1/2017 21:00:00. That way, the data collection system 132 can correlate non-visual data 128 with visual data 130 using each of the one or more data tables.

In some implementations, the data collection system 132 may initiate the process of building a deep learning model for object detection. The data collection system 132 may train the object detection model such that that the object detection model detects the presence of an object or movement of an object in image data alone without the use of non-visual sensors. In order to train the object detection model, the data collection system 132 needs to train the object detection model with image of objects collected by the monitored control unit 108. The data collection system 132 needs to provide a sufficient amount of training data that allows the object detection model to recognize object identification and object movement in visual images alone. In order for the object detection model to identify an object or identify movement in visual images, the data collection system 132 needs to train the object detection model with visual data that is labeled using the non-visual data. Before the data collection system 132 can label the visual data with non-visual data, the data collection system 132 must correlate the non-visual data.

The data collection system 132 retrieves one or more tables of non-visual data 128 and one or more tables of visual data 130 from the sensor database 134 to input to the correlation and filtration module 136 for correlation and pairing. For example, the tables of the non-visual data 128 may include the weight sensor data tables, motion sensor data tables, the seismic sensor data tables, and other sensor data tables. In other implementations, the data collection system 132 may retrieve only a subset of each data table from the non-visual data 128 and the visual data 130 to provide to the correlation and filtration module 136.

In some implementations, the correlation and filtration module 136 correlates the data from the non-visual data tables by filtering the data based on a type of detection. The correlation and filtration module 136 may filter the data based on the type of detection from each of the one or more sensors 110. The object detection model needs to be trained with accurately labeled image data examples and counterexamples. For instance, the examples and counterexamples must include data directed towards objects that the object detection model is being trained to identify and detect for movement. The counterexamples include images that do not include the object for the object detection model to identify and detect. The non-visual sensors provide the labeling for the image provided by the visual sensors without the need for costly human interaction. The correlation and filtration model 136 starts with filtering the non-visual data tables based on a detection type. For example, the correlation and filtration model 136 scans filters the weight data tables, the motion sensor data tables, the seismic sensor data tables, and the other sensor data tables for values that indicate a detection. The correlation and filtration model 136 filters for values, i.e., voltage values, above a particular threshold to determine detected events by each of the one or more sensors 110 that indicate an identified object and object movement.

In some implementations, the correlation and filtration module 136 compares the time ranges from each of the filtered one or more non-visual data tables to one another. The correlation and filtration module 136 searches for overlapping time ranges in the filtered non-visual data tables that indicate a detection. For instance, after the correlation and filtration module 136 filters the one or more non-visual data tables that indicate a detection, the correlation and filtration module 136 compares the time ranges of the one or more non-visual data tables to determine if any of the time ranges overlap. For example, the correlation and filtration module 136 may determine that the weight sensor data table includes detections from 9/23/2017 9:14:20 through 9/23/2017 11:30:00 and the motion sensor data table includes detections from 9/23/2017 9:30:20 through 9/23/2017 11:29:00. The correlation and filtration module 136 pairs the detected non-visual data between the overlapping time periods of detection between the various data tables of the various sensor types. In other implementations, the correlation and filtration module 136 may further compare the locations of the sensors between the overlapped time periods of data. For example, the correlation and filtration module 136 may perform string matching to determine whether the location names for each of the sensors match. If the names of the location matches, then the correlation and filtration module 136 retrieves those rows and can determine that the sensors are located in near proximity to one another. In other implementations, the correlation and filtration module 136 may further compare data of similar sensor types between the overlapped time periods of data.

In some implementations, the correlation and filtration module 136 compares the retrieved rows from the filtered non-visual data 128 data tables to the visual data 130 data tables. The correlation and filtration module 136 determines if any of the visual data 130 from the one or more cameras 112 includes a field of view of the one or more sensors 110 that detected an object during this stage. As done with the filtered non-visual data 128 data tables, the correlation and filtration module 136 compares the visual data 130 data tables to the filtered non-visual data 130 data tables. First, the correlation and filtration module 136 compares the time ranges of the visual data 130 data table to the time ranges of the filtered non-visual data 128 data tables. The correlation and filtration module 136 returns rows from the visual data 130 data table that fall within the time ranges of the filtered non-visual data 128 data tables. In some implementations, the correlation and filtration module 136 may then compare the location of the sensors in the non-visual data 130 data tables to the location of the one or more cameras 112 from the returned rows of the visual data 130 data tables. This ensures the one or more cameras 112 are looking in the same location as the location of the one or more sensors 110 that detected an object.

In some implementations, the correlation and filtration module 136 pairs the returned rows of the visual data 130 with the filtered non-visual data 128 data tables and outputs as paired data 138. In addition, the correlation and filtration module 136 provides an indication of whether the data is for detection or non-detection of object identification or object movement.

The data collection system 132 provides the paired data 138 as input to the data analyzation module 140. In some implementations, the data analyzation module 140 synchronizes one or more data points of the non-visual data 128 to one or more frames of the visual data 130 based on a likelihood of movement or non-movement as indicated from the non-visual data 128. The data analyzation module 140 determines whether the paired data 138 is sufficient training data for the model trainer 144. The data analyzation module 140 ensures the object detection model is trained on data, such as image frames, that is clear and distinguishable. For example, the data analyzation module 140 analyzes a frame from the visual data 128 to determine from image analytics if the frame represents good training data. Specifically, the data analyzation module 140 may determine a resolution of the frame, a brightness level in the frame that could cause false positives during training, and a blurriness level of the frame. If the data analyzation module 140 determines the resolution of a frame is below or above an acceptable threshold range, if the frame brightness is below or above an acceptable threshold range, or if the frame's blurriness is below or above an acceptable threshold range, the data analyzation module 140 labels the non-visual data 128 attached to the labeled data 130 as not containing an object, such as an individual, or not containing movement regardless of whether the non-visual data 128 initially provides a detection of an object or movement.

Alternatively, should the data analyzation module 140 determine that the frame's resolution, the frame's brightness, and the frame's blurriness falls within the acceptable threshold range, the data analyzation module 140 analyzes the non-visual data 128 of the paired data 138 to determine if the value of the non-visual data 128 is above or below a voltage threshold. If the value of the non-visual data 128 is above the voltage threshold, the data analyzation module 140 labels the visual data 130 as "object detected" data, otherwise, the data analyzation module 140 labels the visual data 130 as "not-detected" data. In some implementations, the data analyzation module 140 labels a region of one or more pixels in the frame of the visual data 130 that includes the object as the detected object. The data analyzation module 140 provides the labeled visual data 142 as input to the model trainer 144.

In some implementations, the model trainer 144 receives labeled visual data 142 indicating visual data 130, such as an image frame, of a detection of an identified object or object movement, as designated by the label. The model trainer 144 uses data from the received labeled visual data 142 to train a neural network model or any other type of machine learning model. The neural network model may include an input layer, an output layer, and one or more hidden layers. The model trainer 144 may use a machine learning technique to continuously train the deep learning model as the model trainer 144 receives more data when applying the model. A deep learning model may be a neural network with one or more hidden layers between an input layer and an output layer. For example, the model trainer 144 may train a convolutional neural network model (CNN) or a recurrent neural network model (RNN). The model trainer 144 seeks to train the deep learning model with the labeled visual data 142 as input such that the neural network model can recognize the presence of motion or non-motion in the image frame from the image frame alone. In essence, with enough training data of both object identification and object movement from the sensor database 134, the deep learning model should be able to detect an object and an object's motion from the image frame nearly as accurate as a weight sensor and a motion sensor, such as a PIR, obviating the need for weight and motion sensors in other detection systems.

In some implementations, the model trainer 144 may generate an object detection model, such as a trained visual model 146, after sufficiently training the neural network model. The trained visual model 146 may be used by any other camera 122 in another motion detection system. For example, the data collection system 132 may transmit the trained visual model 146 to one or more other monitored properties 102-B through 102-D. The other monitored properties 102-B through 102-D may include one more cameras such as 122-B through 122-D for motion detection that can use the trained visual model 146 for detection purposes. For instance, the trained visual model 146 may be stored in the camera 122-B's memory and utilized by the camera 122-B for object detection or motion detection without the use of other sensors.

In some implementations, a pre-trained visual classification model is preloaded onto the data collector system 132. The pre-trained visual classification model is stored in the sensor database 134. In some implementations, the pre-trained visual classification model can be adaptively retrained with non-visual data 128 and visual data 130 collected from the monitored control unit 108. In particular, the non-visual data 128 can be used as ground truth and can retrain the visual classification model for improved performance. For retraining the visual classification model, can use the non-visual sensor data stream as a trigger for an event, and can evaluate how well the visual classification model performed (with the stored pre-trained model data) and provides the following modes of correction if the event was not detected by the visual classification model. In particular, the data collector system 132 can collect training samples from the missed event, add them to a training set, and retrain the neural network model for improved classification. Additionally, the data collector system 132 can quantify image settings in the cameras, such as contrast and/or brightness, or in the classification model and can adjust the contrast and/or brightness towards settings that improve detection. For example, an event was missed as a result of strong casted shadows in the scene affecting the camera's contrast. The missed event is attributed to poor contrast and hence the image sensor settings are adjusted by the data collector system 132. Additionally, the data collector system 132 can monitor and quantify the performance of the visual system as a function of image-sensor settings, weather (e.g., if a rain-sensor is connected to the system), time of day (e.g., good image during the time of day, poor image in IR settings). As a result, the data collector system 132 can adjust the visual system settings (e.g., sensors and the visual model) using learned data.

In some implementations, the camera 122-B may record real-time of an area of the monitored property 102-B. The camera 122-B can provide each frame of the real-time video feed to the trained visual model 146 in memory. If the trained visual model 146 produces an output indicating a detection in response to analyzing a frame of the real-time video feed, the camera 122-B may provide an indication to the monitor control unit located in the monitored property 102-B. In response, the monitor control unit may transmit a notification to the client device, such as client device 106, that the camera 122-B has detected motion. For example, the notification may include a push notification, a short message service (SMS), or an instant message. In other implementations, the monitor control unit may transmit the live video feed from the camera 122-B to the client device 106 for real-time viewing purposes.

The data collection system 132 may receive feedback from the monitor control unit, such as monitor control unit 108. The feedback may be similar to the data used to train the neural network model in the model trainer 144. The data collection system 132 may provide the feedback to the model trainer 144 to tune the trained visual model 146. For example, the camera 122-A that includes the trained visual model 146 provides an indication of object identification or object movement to the client device 106 of user 104. After the user 104 reviews the indication of identification or movement from the camera 122-A, which includes the real-time video feed from the camera 122-A or the frame where object or movement was detected, the user 104 determines the trained visual model 146 produced an error and no object exists in the frame or no movement actually occurred. The user 104 interacts with the client device 106 to indicate that an object does not exist or movement did not actually occur, and the client device 106 transmits a notification to the monitor control unit 108. The monitor control unit 108 provides an indication to the data collection system 132 that the trained visual model 146 incorrectly detected an object or object movement along with the non-visual data 128, the visual data 130 of the incorrect detection, and non-visual data 128 from the one or more sensors at the monitored property 102-A. The data collection system 132 provides the newly received non-visual data 128 and visual data 130 of the incorrect detection to the model trainer 144 in the same manner used to train the neural network model in the model trainer 144. The data collection system 132 may then provide the updated trained visual model 146 to each of the cameras 102-A through 102-D for improved detection.

In some implementations, the system 100 can be implemented for monitoring a flow of vehicles, such as vehicle 126, into and out of a garage of a monitored property 102-A. The garage may be equipped with one or more sensors 110, one or more cameras 112, a light curtain sensor, and one or more inductive loop sensors. In some implementations, as vehicle 126 passes into and out of the garage over time, along with other vehicles that may park in the garage, the aforementioned garage sensors may provide an accurate indication that a vehicle is present in the garage.

In some implementations, the garage sensors may also provide an indication of a size of the vehicle, a profile of the vehicle, a make and model of the vehicle. For example, the light curtain sensor provides a 1-dimensional scan of the vehicle as the vehicle drives through the garage. The data collection system 132 can use the 1-dimensional scan of the vehicle and video recording of the video as non-visual data 128 and visual data 130, respectively, to train the trained visual model 146. In particular, the data collection system 132 can tag the visual data 130 video recording with the silhouette of the 1-dimensional scan of the vehicle to create labeled visual data 142. This process is performed in a similar manner as described with non-visual data 128 and visual data 130 passing through the correlation and filtration 136 and the data analyzation module 140. The data collection system 132 can provide the labeled visual data 142 of the visual data 130 video recording tagged with the 1-dimensional scan of the vehicle as input to the model trainer 144. Additionally, the data collection system 132 can provide the labeled visual data 142 of the visual data 130 video recording tagged with no detection of a vehicle as input to the model trainer 144. The model trainer 144 can use these two types of labeled visual data 142 to train a neural network model, such as trained visual model 146, to recognize classes of vehicles from imagery alone, with no human ground truth.

In some implementations, the system 100 can be implemented for monitoring the health of the one or more sensors 110, a light curtain sensor, and one or more inductive loop sensors. After the one or more cameras 112 receives the trained visual model 146, the one or more cameras 112 may detect an object or detect movement of an object. If a sensor 110, such as a motion sensor, fails to trip when the object moves in view of the camera 110 and in view of the motion sensor, the monitor control unit 250 can provide an indication that the motion sensor is faulty or broken. As a result, the monitor control unit 250 can provide an indication to client device 106 to notify user 104 of a broken sensor 110.

Other sensors 110 can be detected by the monitor control unit 250 to be faulty or broken, such as a weight sensor or a light curtain.

Figure 2:
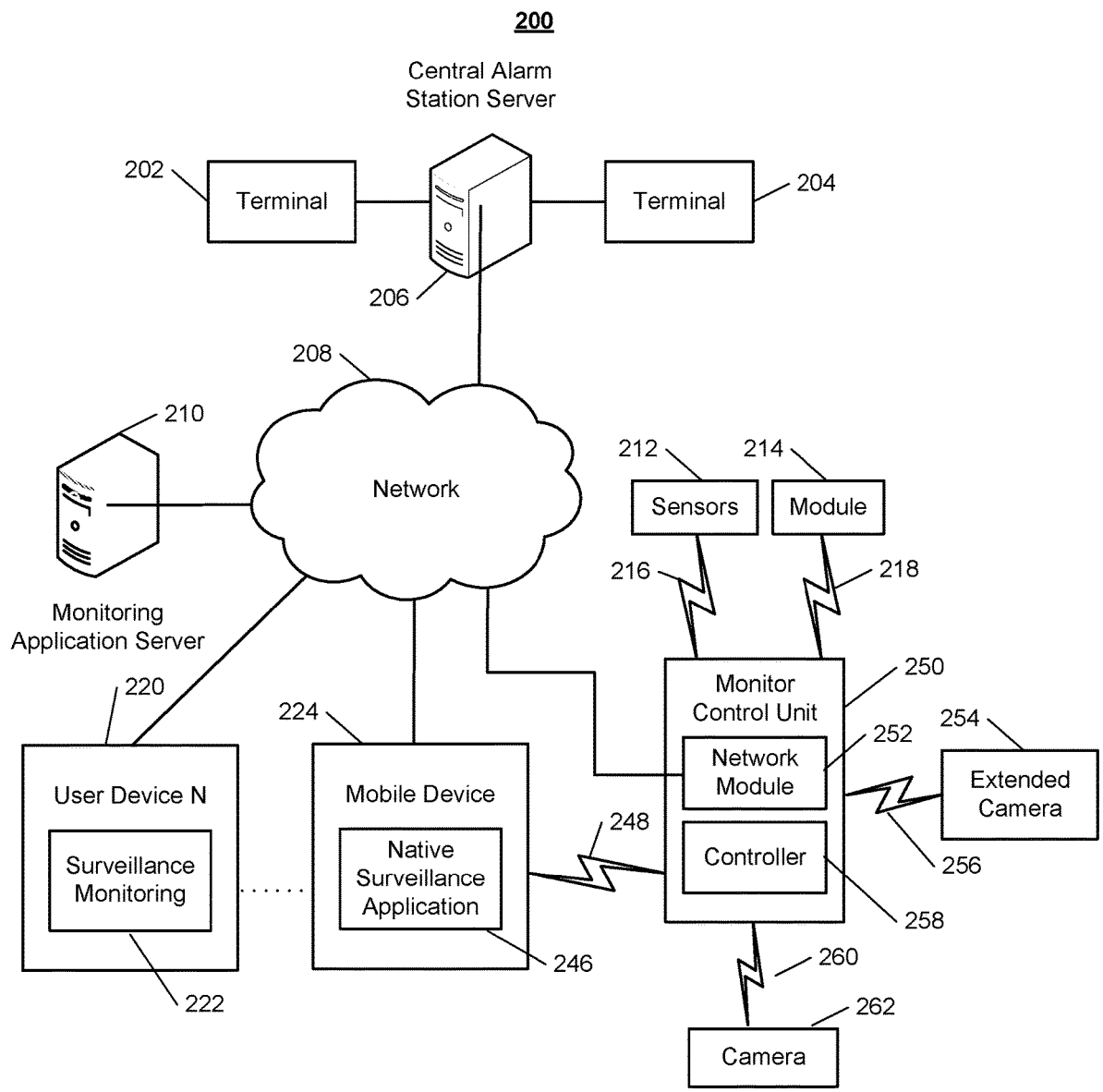
FIG. 2 is an example of a monitoring system integrated with an extended camera.

FIG. 2 illustrates an example of a system 200 configured an example system that is capable of training the neural network model for object identification and object movement. The system 200 includes a network 208, a monitoring system control unit 250, one or more user devices 220, 224, a monitoring application server 210, and a central alarm station server 206. In some examples, the network 208 facilitates communications between the monitoring system control unit 250, the one or more user devices 220, 224 the monitoring application server 210, and the central alarm station server 206.

The network 208 is configured to enable exchange of electronic communications between devices connected to the network 208. For example, the network 208 may be configured to enable exchange of electronic communications between the monitoring system control unit 250, the one or more user devices 220, 224, the monitoring application server 210, and the central alarm station server 206. The network 208 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 208 may include multiple networks or subnetworks, each of which may include, for example, a wired or wireless data pathway. The network 208 may include a circuit-switched network, a packet-switched data network, or any other network able to carry electronic communications (e.g., data or voice communications). For example, the network 208 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 208 may include one or more networks that include wireless data channels and wireless voice channels. The network 208 may be a wireless network, a broadband network, or a combination of networks including a wireless network and a broadband network.

The monitoring system control unit 250 includes a controller 258 and a network module 252. The controller 258 is configured to control a monitoring system (e.g., a home alarm or security system) that includes the monitoring system control unit 250. In some examples, the controller 258 may include a processor or other control circuitry configured to execute instructions of a program that controls operation of an alarm system. In these examples, the controller 258 may be configured to receive input from sensors, detectors, or other devices included in the alarm system and control operations of devices included in the alarm system or other household devices (e.g., a thermostat, an appliance, lights, etc.). For example, the controller 258 may be configured to control operation of the network module 252 included in the monitoring system control unit 250.

The network module 252 is a communication device configured to exchange communications over the network 208. The network module 252 may be a wireless communication module configured to exchange wireless communications over the network 208. For example, the network module 252 may be a wireless communication device configured to exchange communications over a wireless data channel and a wireless voice channel. In this example, the network module 252 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 252 also may be a wired communication module configured to exchange communications over the network 208 using a wired connection. For instance, the network module 252 may be a modem, a network interface card, or another type of network interface device. The network module 252 may be an Ethernet network card configured to enable the monitoring system control unit 250 to communicate over a local area network and/or the Internet. The network module 252 also may be a voiceband modem configured to enable the alarm panel to communicate over the telephone lines of Plain Old Telephone Systems (POTS).

The monitoring system that includes the monitoring system control unit 250 includes one or more sensors or detectors. For example, the monitoring system may include multiple sensors 212. The sensors 212 may include a contact sensor, a motion sensor, a glass break sensor, or any other type of sensor included in an alarm system or security system. The sensors 212 also may include an environmental sensor, such as a temperature sensor, a water sensor, a rain sensor, a wind sensor, a light sensor, a smoke detector, a carbon monoxide detector, an air quality sensor, etc. The sensors 212 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 212 may include a radio-frequency identification (RFID) sensor that identifies a particular article that includes a pre-assigned RFID tag.

The monitoring system control unit 250 communicates with the module 214 and the camera 262 to perform surveillance or monitoring. The module 214 is connected to one or more lighting systems and is configured to control operation of the one or more lighting systems. The module 214 may control the one or more lighting systems based on commands received from the monitoring system control unit 250. For instance, the module 214 may cause a lighting system to illuminate an area to provide a better image of the area when captured by a camera 262.

The camera 262 may be a video/photographic camera or other type of optical sensing device configured to capture images. For instance, the camera 262 may be configured to capture images of an area within a building monitored by the monitoring system control unit 250. The camera 262 may be configured to capture single, static images of the area and also video images of the area in which multiple images of the area are captured at a relatively high frequency (e.g., thirty images per second). The camera 262 may be controlled based on commands received from the monitoring system control unit 250.

The camera 262 may be triggered by several different types of techniques. For instance, a Passive Infra-Red (PIR) motion sensor may be built into the camera 262 and used to trigger the camera 262 to capture one or more images when motion is detected. The camera 262 also may include a microwave motion sensor built into the camera and used to trigger the camera 262 to capture one or more images when motion is detected. The camera 262 may have a "normally open" or "normally closed" digital input that can trigger capture of one or more images when external sensors (e.g., the sensors 212, PIR, door/window, etc.) detect motion or other events. In some implementations, the camera 262 receives a command to capture an image when external devices detect motion or another potential alarm event. The camera 262 may receive the command from the controller 258 or directly from one of the sensors 212.

In some examples, the camera 262 triggers integrated or external illuminators (e.g., Infra-Red, Z-wave controlled "white" lights, lights controlled by the module 214, etc.) to improve image quality when the scene is dark. An integrated or separate light sensor may be used to determine if illumination is desired and may result in increased image quality.

The camera 262 may be programmed with any combination of time/day schedules, system "arming state", or other variables to determine whether images should be captured or not when triggers occur. The camera 262 may enter a low-power mode when not capturing images. In this case, the camera 262 may wake periodically to check for inbound messages from the controller 258. The camera 262 may be powered by internal, replaceable batteries if located remotely from the monitoring system control unit 250. The camera 262 may employ a small solar cell to recharge the battery when light is available. Alternatively, the camera 262 may be powered by the controller's 258 power supply if the camera 262 is co-located with the controller 258.

The sensors 212, the module 214, the camera 262, and the extended camera 254 communicate with the controller 258 over communication links 216, 218, 256, and 260. The communication links 216, 218, 256, and 260 may be a wired or wireless data pathway configured to transmit signals from the sensors 212, the module 214, and the camera 262 to the controller 258. The sensors 212, the module 214, and the camera 262 may continuously transmit sensed values to the controller 258, periodically transmit sensed values to the controller 258, or transmit sensed values to the controller 258 in response to a change in a sensed value.

The communication link 256 over which the extended camera 254 and the controller 258 communicate may include a local network. The extended camera 254 and the controller 258 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 210 is an electronic device configured to provide monitoring services by exchanging electronic communications with the monitoring system control unit 250, the one or more user devices 220, 224, and the central alarm station server 206 over the network 208. For example, the monitoring application server 210 may be configured to monitor events (e.g., alarm events) generated by the monitoring system control unit 250. In this example, the monitoring application server 210 may exchange electronic communications with the network module 252 included in the monitoring system control unit 250 to receive information regarding events (e.g., alarm events) detected by the monitoring system control unit 250. The monitoring application server 210 also may receive information regarding events (e.g., alarm events) from the one or more user devices 220, 224.

In some examples, the monitoring application server 210 may route alarm data received from the network module 252 or the one or more user devices 220, 224 to the central alarm station server 206. For example, the monitoring application server 210 may transmit the alarm data to the central alarm station server 206 over the network 208.

The monitoring application server 210 may store sensor and image data received from the monitoring system and perform analysis of sensor and image data received from the monitoring system. Based on the analysis, the monitoring application server 210 may communicate with and control aspects of the monitoring system control unit 250 or the one or more user devices 220, 224.

The central alarm station server 206 is an electronic device configured to provide alarm monitoring service by exchanging communications with the monitoring system control unit 250, the one or more user devices 220, 224, and the monitoring application server 210 over the network 208. For example, the central alarm station server 206 may be configured to monitor alarm events generated by the monitoring system control unit 250. In this example, the central alarm station server 206 may exchange communications with the network module 252 included in the monitoring system control unit 250 to receive information regarding alarm events detected by the monitoring system control unit 250. The central alarm station server 206 also may receive information regarding alarm events from the one or more user devices 220, 224.

The central alarm station server 206 is connected to multiple terminals 202 and 204. The terminals 202 and 204 may be used by operators to process alarm events. For example, the central alarm station server 206 may route alarm data to the terminals 202 and 204 to enable an operator to process the alarm data. The terminals 202 and 204 may include general-purpose computers (e.g., desktop personal computers, workstations, or laptop computers) that are configured to receive alarm data from a server in the central alarm station server 206 and render a display of information based on the alarm data. For instance, the controller 258 may control the network module 252 to transmit, to the central alarm station server 206, alarm data indicating that a sensor 212 detected a door opening when the monitoring system was armed. The central alarm station server 206 may receive the alarm data and route the alarm data to the terminal 202 for processing by an operator associated with the terminal 202. The terminal 202 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 202 and 204 may be mobile devices or devices designed for a specific function. Although FIG. 2 illustrates two terminals for brevity, actual implementations may include more (and, perhaps, many more) terminals.

The one or more user devices 220, 224 are devices that host and display user interfaces. For instance, the user device 224 is a mobile device that hosts one or more native applications (e.g., the native surveillance application 246). The user device 224 may be a cellular phone or a non-cellular locally networked device with a display. The user device 224 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 224 may perform functions unrelated to the monitoring system, such as placing personal telephone calls, playing music, playing video, displaying pictures, browsing the Internet, maintaining an electronic calendar, etc.

The user device 224 includes a native surveillance application 246. The native surveillance application 246 refers to a software/firmware program running on the corresponding mobile device that enables the user interface and features described throughout. The user device 224 may load or install the native surveillance application 246 based on data received over a network or data received from local media. The native surveillance application 246 runs on mobile devices platforms, such as iPhone, iPod touch, Blackberry, Google Android, Windows Mobile, etc. The native surveillance application 246 enables the user device 224 to receive and process image and sensor data from the monitoring system The user device 220 may be a general-purpose computer (e.g., a desktop personal computer, a workstation, or a laptop computer) that is configured to communicate with the monitoring application server 210 and/or the monitoring system control unit 250 over the network 208. The user device 220 may be configured to display a surveillance monitoring user interface 222 that is generated by the user device 220 or generated by the monitoring application server 210. For example, the user device 220 may be configured to display a user interface (e.g., a web page) provided by the monitoring application server 210 that enables a user to perceive images captured by the camera 262 and/or reports related to the monitoring system. Although FIG. 2 illustrates two user devices for brevity, actual implementations may include more (and, perhaps, many more) or fewer user devices.

In some implementations, the one or more user devices 220, 224 communicate with and receive monitoring system data from the monitoring system control unit 250 using the communication link 248. For instance, the one or more user devices 220, 224 may communicate with the monitoring system control unit 250 using various local wireless protocols such as Wi-Fi, Bluetooth, zwave, zigbee, HomePlug (ethernet over powerline), or wired protocols such as Ethernet and USB, to connect the one or more user devices 220, 224 to local security and automation equipment. The one or more user devices 220, 224 may connect locally to the monitoring system and its sensors and other devices. The local connection may improve the speed of status and control communications because communicating through the network 208 with a remote server (e.g., the monitoring application server 210) may be significantly slower.

Although the one or more user devices 220, 224 are shown as communicating with the monitoring system control unit 250, the one or more user devices 220, 224 may communicate directly with the sensors and other devices controlled by the monitoring system control unit 250. In some implementations, the one or more user devices 220, 224 replace the monitoring system control unit 250 and perform the functions of the monitoring system control unit 250 for local monitoring and long range/offsite communication.

In other implementations, the one or more user devices 220, 224 receive monitoring system data captured by the monitoring system control unit 250 through the network 208. The one or more user devices 220, 224 may receive the data from the monitoring system control unit 250 through the network 208 or the monitoring application server 210 may relay data received from the monitoring system control unit 250 to the one or more user devices 220, 224 through the network 208. In this regard, the monitoring application server 210 may facilitate communication between the one or more user devices 220, 224 and the monitoring system.

In some implementations, the one or more user devices 220, 224 may be configured to switch whether the one or more user devices 220, 224 communicate with the monitoring system control unit 250 directly (e.g., through link 248) or through the monitoring application server 210 (e.g., through network 208) based on a location of the one or more user devices 220, 224. For instance, when the one or more user devices 220, 224 are located close to the monitoring system control unit 250 and in range to communicate directly with the monitoring system control unit 250, the one or more user devices 220, 224 use direct communication. When the one or more user devices 220, 224 are located far from the monitoring system control unit 250 and not in range to communicate directly with the monitoring system control unit 250, the one or more user devices 220, 224 use communication through the monitoring application server 210.

Although the one or more user devices 220, 224 are shown as being connected to the network 208, in some implementations, the one or more user devices 220, 224 are not connected to the network 208. In these implementations, the one or more user devices 220, 224 communicate directly with one or more of the monitoring system components and no network (e.g., Internet) connection or reliance on remote servers is needed.

In some implementations, the one or more user devices 220, 224 are used in conjunction with only local sensors and/or local devices in a house. In these implementations, the system 200 only includes the one or more user devices 220, 224, the sensors 212, the module 214, and the camera 262. The one or more user devices 220, 224 receive data directly from the sensors 212, the module 214, and the camera 262 and sends data directly to the sensors 212, the module 214, and the camera 262. The one or more user devices 220, 224 provide the appropriate interfaces/processing to provide visual surveillance and reporting.

In other implementations, the system 200 further includes network 208 and the sensors 212, the module 214, and the camera 262 are configured to communicate sensor and image data to the one or more user devices 220, 224 over network 208 (e.g., the Internet, cellular network, etc.). In yet another implementation, the sensors 212, the module 214, and the camera 262 (or a component, such as a bridge/router) are intelligent enough to change the communication pathway from a direct local pathway when the one or more user devices 220, 224 are in close physical proximity to the sensors 212, the module 214, and the camera 262 to a pathway over network 208 when the one or more user devices 220, 224 are farther from the sensors 212, the module 214, and the camera 262. In some examples, the system leverages GPS information from the one or more user devices 220, 224 to determine whether the one or more user devices 220, 224 are close enough to the sensors 212, the module 214, and the camera 262 to use the direct local pathway or whether the one or more user devices 220, 224 are far enough from the sensors 212, the module 1214, and the camera 262 that the pathway over network 208 is required. In other examples, the system leverages status communications (e.g., pinging) between the one or more user devices 220, 224 and the sensors 212, the module 214, and the camera 262 to determine whether communication using the direct local pathway is possible. If communication using the direct local pathway is possible, the one or more user devices 220, 224 communicate with the sensors 212, the module 214, and the camera 262 using the direct local pathway. If communication using the direct local pathway is not possible, the one or more user devices 220, 224 communicate with the sensors 212, the module 214, and the camera 262 using the pathway over network 208.

In some implementations, the system 200 provides end users with access to images captured by the camera 262 to aid in decision making. The system 200 may transmit the images captured by the camera 262 over a wireless WAN network to the user devices 220, 224. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 262). In these implementations, the camera 262 may be set to capture images on a periodic basis when the alarm system is armed in an "Away" state, but set not to capture images when the alarm system is armed in a "Stay" state or disarmed. In addition, the camera 262 may be triggered to begin capturing images when the alarm system detects an event, such as an alarm event, a door opening event for a door that leads to an area within a field of view of the camera 262, or motion in the area within the field of view of the camera 262. In other implementations, the camera 262 may capture images continuously, but the captured images may be stored or transmitted over a network when needed.

In some implementations, all of the processing described throughout this disclosure may be implemented in a monitoring system control panel located inside the property being monitored, as opposed to sending data to an external server for processing. For example, rather than being a separate server located in a remote location, the monitoring application server 210 may be a logical component inside of the monitoring system control unit 250. In this example, the monitoring system control unit 150 performs the processing of supervising property access without having to send image/video data to a separate server separated by a network.

In other implementations, all of the processing described throughout this disclosure may be performed on a remote server (e.g., monitoring application server 210). In these implementations, the monitoring system control panel (or sensors themselves) may send image/video data to the remote server over a network and the remote server may perform all of supervising property access. For instance, the monitoring system control unit 250 sends all captured image/video data to the monitoring application server 210 and the monitoring application server 210 performs the processing of supervising property access.

In still further implementations, the processing described throughout this disclosure may be mixed between a monitoring system control panel and a remote server. In these implementations, the monitoring system control panel and the remote server may share operations needed to analyze the sensor data. For instance, the monitoring system control panel may perform the interpretation of image/video data collected relatively recently (e.g., image/video data collected within the past three months) and the remote server may perform the detection of patterns in image/video data collected over a longer period of time (e.g., image/video data collected over the past several years). Alternatively, the monitoring system control panel may perform pre-processing of the image/video data, including collection and aggregation of the image/video data, and the remote server may perform the detailed analysis of detecting patterns within the image/video data. In the example shown in FIG. 2, the processing described throughout this disclosure may be mixed between the monitoring system control unit 250 and the monitoring application server 210.

FIG. 3 is a flowchart of an example process 300 for generating a trained neural network model for one or more cameras to use for motion detection. Generally, the process 300 includes obtaining data from one or more non-visual sensors and a camera from a first monitoring system; based on the obtained data from the one or more non-visual sensors and the camera, pairing the non-visual data from the one or more non-visual sensors with corresponding visual data from the camera; based on the pairing from the non-visual data from the non-visual sensors with the corresponding data from the camera, synchronizing one or more data points of the non-visual data with one or more frames of the visual data based on a likelihood of movement or non-movement indicated in the non-visual data; providing the synchronized one or more data points of the non-visual data with the one or more frames of the visual data as labeled input to neural network model to train the neural network model to distinguish between movement and non-movement in real-time visual data; and, providing the trained neural network model to one or more cameras corresponding to one or more additional monitoring systems to detect movement and non-movement in the real-time visual data. Alternatively, the process 300 can be used for generating a trained neural network model for other implementations for one or more cameras, such as depth perception differentiation and object classification, to name a few examples. The process 300 will be described as being performed by a computer system comprising one or more computers, for example, the system 100 as shown in FIG. 1 or the computing system 200 as shown in FIG. 2.

During 302, the system obtains data from one or more non-visual sensors and a camera from a first monitoring system. The data collection system 132 may obtain non-visual data 128 and visual data 130 for generating an object detection model 146. In some implementations, the non-visual data 128 may include data provided by each of the one or more sensors 110. This data may include data values provided by the one or more sensors 110, timestamps associated with each of the data values, a device ID associated with each of the data values, and a string value of an associated sensor type with each of the data values. For example, the data values provided by the one or more sensors 110 can include one or more voltage values corresponding to the sensors 110; the timestamps associated with each of the data values can include a time at which the data values were recorded; a device ID can be a number or string value representing the one or more sensors 110; and, the string value of the associated sensor type with each of the data values can include a string value of the location of the sensor, such as "KITCHEN" and a string value of the type of sensor, such as "MOTION." The visual data 130 may include video stream in packet format provided by the one or more cameras 112, the device ID of the camera 112 that provided the video stream, a timestamp, and a location of the camera 112 in the monitored property 102. The data collection system 132 may store the non-visual data 128 and the visual data 130 in the sensor database 134.

During 304, the system, based on the obtained data from the one or more non-visual sensors and the camera, pairs the non-visual data from the one or more non-visual sensors with corresponding visual data from the camera. The correlation and filtration module 136 correlates the data from the non-visual data tables retrieved from the sensor database 134 by filtering the data based on a type of detection. The correlation and filtration module 136 may filter the data based on the type of detection from each of the one or more sensors 110. For example, the correlation and filtration model 136 filters the weight data tables, the motion sensor data tables, the seismic sensor data tables, and the other sensor data tables for values that indicate a detection. The correlation and filtration model 136 filters for values, i.e., voltage values, above a particular threshold to determine detected events by each of the one or more sensors 110 that indicate an identified object and object movement.

In some implementations, the correlation and filtration module 136 compares the time ranges from each of the filtered one or more non-visual data tables to one another. The correlation and filtration module 136 searches for overlapping time ranges in the filtered non-visual data tables that indicate a detection. The correlation and filtration module 136 pairs the detected non-visual data between the overlapping time periods of detection between the various data tables of the various sensor types. For example, if a first set of data has a time range of 12:01 PM to 3:30 PM and a second set of data has a time range of 1:00 PM to 4:00 PM, then the correlation and filtration module pairs a portion of the first data with a time range of 1:00 PM to 3:30 PM with a second portion of second data with a similar time range of 1:00 PM to 3:30 PM due to the time ranges overlapping.

In some implementations, the correlation and filtration module 136 compares the retrieved rows from the non-visual data 128 data tables that have been filtered to the visual data 130 data tables. As done with the filtered non-visual data 128 data tables, the correlation and filtration module 136 compares the visual data 130 data tables to the filtered non-visual data 130 data tables. First, the correlation and filtration module 136 compares the time ranges of the visual data 130 data table to the time ranges of the filtered non-visual data 128 data tables. The correlation and filtration module 136 returns rows from the visual data 130 data table that fall within the time ranges of the filtered non-visual data 128 data tables.

During 306, the system, based on the pairing from the non-visual data from the non-visual sensors with the corresponding data from the camera, synchronizes one or more data points of the non-visual data with one or more frames of the visual data based on a likelihood of movement or non-movement indicated in the non-visual data. The data analyzation module 140 determines whether the paired data 138 is sufficient training data for the model trainer 144. The data analyzation module 140 ensures the object detection model is trained on data that is clear and distinguishable. For example, the data analyzation module 140 analyzes a frame from the visual data 128 to determine from image analytics if the frame represents good training data. Specifically, the data analyzation module 140 may determine a resolution of the frame, a brightness level in the frame that could cause false positives during training, and a blurriness level of the frame. For example, a resolution of a frame can be 1080× 1920 pixels; a brightness of a frame can be 1 lux; and, a blurriness level of the frame can be measured by performing a Fourier transform on the frame and passing the result through a high pass filter to analyze its sharpness and conversely the frame's blurriness, such as an image's frequency level.

In some implementations, if the data analyzation module 140 determines the resolution of a frame is below or above an acceptable threshold range, if the frame brightness is below or above an acceptable threshold range, or if the frame's blurriness is below or above an acceptable threshold range, the data analyzation module 140 labels the non-visual data 128 attached to the labeled data 130 as not containing an object, such as an individual, or not containing movement regardless of whether the non-visual data 128 initially provides a detection of object or movement. Alternatively, should the data analyzation module 140 determine that the frame's resolution, the frame's brightness, and the frame's blurriness fall's within the acceptable threshold range, the data analyzation module 140 analyzes the non-visual data 128 of the paired data 138 to determine if the value of the non-visual data 128 is above or below a voltage threshold. If the value of the non-visual data 128 is above the voltage threshold, the data analyzation module 140 labels the visual data 130 as "object detected" data, otherwise, the data analyzation module 140 labels the visual data 130 as "not-detected" data.

During 308, the system provides the synchronized one or more data points of the non-visual data with the one or more frames of the visual data as labeled input to neural network model to train the neural network model to distinguish between movement and non-movement in real-time visual data. In some implementations, the data analyzation module 140 provides the labeled visual data 142 as input to the model trainer 144. The model trainer 144 uses data from the received labeled visual data 142 to train a neural network model or any other type of machine learning model. The model trainer 144 seeks to train the neural network model with the labeled visual data 142 as input such that the neural network model can recognize the presence of motion or non-motion in the image frame from the image frame alone. In essence, with enough training data of both object identification and object movement from the sensor database 134, the neural network model should be able to detect an object and an object's motion from the image frame nearly as accurate as a weight sensor and a motion sensor, such as a PIR, obviating the need for weight and motion sensors in other detection systems.

In other implementations, the system provides the synchronized one or more data points of the non-visual data with the one or more frames of the visual data as labeled input to neural network model to train the neural network model to detect an event. For example, the synchronized one or more data points of the non-visual data with the one or more frames of the visual data provided as labeled input to the neural network model to train the neural network model to detect an event such as, e.g., the presence of, event of motion, event of non-motion, event of detection of an object with a particular characteristic, distinguish between movement and non-movement, and differentiating between characteristics of objects found in the visual data based on the non-visual data, to name a few examples. For example, the neural network can be trained to detect a person moving, a moving animal, a falling object amongst other objects in the background, a vehicle in an image, and movement of a vehicle.

During 310, the system provides the trained neural network model to one or more cameras corresponding to one or more additional monitoring systems to detect movement and non-movement in the real-time visual data. In some implementations, the model trainer 144 may generate an object detection model, such as a trained visual model 146, after sufficiently training the neural network model. The trained visual model 146 may be used by any other camera 122 in another motion detection system. For example, the data collection system 132 may transmit the trained visual model 146 to one or more other monitored properties 102-B through 102-D. The other monitored properties 102-B through 102-D may include one more cameras such as 122-B through 122-D for motion detection that can use the trained visual model 146 for motion detection purposes.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
obtaining data from one or more non-visual sensors and a camera from a first monitoring system, wherein the data includes non-visual data from the non-visual sensors and visual data obtained from the camera;
based on the obtained data from the one or more non-visual sensors and the camera, pairing the non-visual data from the one or more non-visual sensors with corresponding visual data from the camera;
based on the pairing from the non-visual data from the non-visual sensors with the corresponding data from the camera, synchronizing one or more data points of the non-visual data with one or more frames of the visual data based on a likelihood of an event indicated in the non-visual data;
providing the synchronized one or more data points of the non-visual data with the one or more frames of the visual data as labeled input to a neural network model to train the neural network model to detect the event;
providing the trained neural network model to one or more cameras corresponding to one or more additional monitoring systems to detect the event in the visual data obtained by the one or more cameras;
receiving data indicating that the trained neural network model detected movement at the monitored property;
providing data indicating to a user of the first monitoring system that the trained neural network model has detected movement at the monitored property, wherein the data comprises real-time video feed of the detected movement;
receiving, from a client device of the user of the first monitoring system, data indicating that the trained neural network produced an error in detecting the movement at the monitored property, wherein the data comprises a notification indicating no movement in the real-time video feed, the real-time video feed, and data from the non-visual sensors that has timestamps corresponding to timestamps of the real-time video feed; and
providing the real-time video feed and the data from the non-visual sensors indicated by the notification received from the client device to the trained neural network model to update the trained neural network model for improved detection.

2. The method of claim 1, wherein the non-visual data from the one or more non-visual sensors comprises data values provided by the non-visual sensors, timestamps corresponding to each of the data values, a device ID corresponding to each of the non-visual sensors that provided the data values, a string value of a location for each of the non-visual sensors, and a string value for a type of the non-visual sensors; and
wherein the visual data from the camera comprises video stream data, a device ID of the camera that provided the video stream data, a timestamp of the video stream data, and data indicating a location of the camera in the first monitoring system.

3. The method of claim 1, wherein pairing the non-visual data from the one or more non-visual sensors with the corresponding visual data from the camera further comprises:
retrieving the non-visual data from the one or more non-visual sensors and the visual data from the camera from a sensor database;
filtering the data from the one or more non-visual sensors based on a type of the detection, wherein the data from the one or more non-visual sensors comprises weight data, motion sensor data, and seismic data, by:
determining one or more overlapping time ranges of data from the one or more non-visual sensors that each indicate a detection of movement;
in response to determining the one or more overlapping time ranges of data from the one or more non-visual sensors that each indicate the detection of movement, comparing the overlapping time ranges of data from the one or more non-visual sensors to time ranges of the visual data stored in the database; and
in response to determining that one or more segments of time of the visual data fall within the overlapping time ranges of data from the one or more non-visual sensors, pairing the visual data of the one or more segments of time to the data from the one or more non-visual sensors with the overlapping time ranges.

4. The method of claim 3, wherein synchronizing the one or more data points of the non-visual data with the one or more frames of the visual data further comprises:
determining a resolution of a frame of the visual data;
determining a brightness of the frame of the visual data; and
determining a blurriness of the frame of the visual data.

5. A computer-implemented method comprising:
obtaining data from one or more non-visual sensors and a camera from a first monitoring system, wherein the data includes non-visual data from the non-visual sensors and visual data obtained from the camera;
based on the obtained data from the one or more non-visual sensors and the camera, pairing the non-visual data from the one or more non-visual sensors with corresponding visual data from the camera;
based on the pairing from the non-visual data from the non-visual sensors with the corresponding data from the camera, synchronizing one or more data points of the non-visual data with one or more frames of the visual data based on a likelihood of an event indicated in the non-visual data, wherein synchronizing comprises:
comparing resolution of a frame of the visual data to a first threshold;
comparing brightness of the frame of the visual data to a second threshold;
comparing blurriness of the frame of the visual data to a third threshold;
in response to determining the resolution of the frame falls within a first acceptable range of the first threshold, determining the brightness of the frame falls within a second acceptable range of the second threshold, and determining the blurriness of the frame falls within a third acceptable range of the third threshold, comparing the paired non-visual data corresponding to the frame of the visual data to a voltage threshold; and
in response to determining the non-visual data exceeds the voltage threshold, labeling the frame of the visual data as object detected;
providing the synchronized one or more data points of the non-visual data with the one or more frames of the visual data as labeled input to a neural network model to train the neural network model to detect the event; and
providing the trained neural network model to one or more cameras corresponding to one or more additional monitoring systems to detect the event in the visual data obtained by the one or more cameras.

6. The method of claim 5, further comprising in response to determining the non-visual data does not exceed the voltage threshold, labeling the frame of the visual data as not detected.

7. The method of claim 1, wherein the trained neural network model is an object detection model trained using a mixture of data indicating when a movement event occurred and data indicating a non-movement event occurred.

8. The method of claim 5, further comprising:
receiving data indicating that the trained neural network model detected movement at the monitored property;

providing data indicating to an owner of the monitored property that the trained neural network model has detected movement at the monitored property, wherein the data comprises real-time video feed of the detected movement;

receiving, from a client device of the owner, data indicating that the trained neural network produced an error in detecting the movement at the monitored property, wherein the data comprises a notification from the owner indicating no movement in the real-time video feed, the real-time video feed, and data from the non-visual sensors that has timestamps corresponding to timestamps of the real-time video feed; and providing the real-time video feed and the data from the non-visual sensors received from the client device to the trained neural network model to update the trained neural network model for improved detection.

9. A monitoring system, the monitoring system comprising:

one or more controllers that store instructions that are operable, when executed by the one or more controllers, to cause the one or more controllers to perform operations comprising:

obtaining data from one or more non-visual sensors and a camera from a first monitoring system, wherein the data includes non-visual data from the non-visual sensors and visual data obtained from the camera;

based on the obtained data from the one or more non-visual sensors and the camera, pairing the non-visual data from the one or more non-visual sensors with corresponding visual data from the camera;

based on the pairing from the non-visual data from the non-visual sensors with the corresponding data from the camera, synchronizing one or more data points of the non-visual data with one or more frames of the visual data based on a likelihood of an event indicated in the non-visual data;

providing the synchronized one or more data points of the non-visual data with the one or more frames of the visual data as labeled input to a neural network model to train the neural network model to detect the event;

providing the trained neural network model to one or more cameras corresponding to one or more additional monitoring systems to detect the event in the visual data obtained by the one or more cameras;

receiving data indicating that the trained neural network model detected movement at the monitored property;

providing data indicating to a user of the first monitoring system that the trained neural network model has detected movement at the monitored property, wherein the data comprises real-time video feed of the detected movement;

receiving, from a client device of the user of the first monitoring system, data indicating that the trained neural network produced an error in detecting the movement at the monitored property, wherein the data comprises a notification indicating no movement in the real-time video feed, the real-time video feed, and data from the non-visual sensors that has timestamps corresponding to timestamps of the real-time video feed; and providing the real-time video feed and the data from the non-visual sensors indicated by the notification received from the client device to the trained neural network model to update the trained neural network model for improved detection.

10. The monitoring system of claim 9, wherein the non-visual data from the one or more non-visual sensors comprises data values provided by the non-visual sensors, timestamps corresponding to each of the data values, a device ID corresponding to each of the non-visual sensors that provided the data values, a string value of a location for each of the non-visual sensors, and a string value for a type of the non-visual sensors; and wherein the visual data from the camera comprises video stream data, a device ID of the camera that provided the video stream data, a timestamp of the video stream data, and data indicating a location of the camera in the first monitoring system.

11. The monitoring system of claim 9, wherein pairing the non-visual data from the one or more non-visual sensors with the corresponding visual data from the camera further comprises:

retrieving the non-visual data from the one or more non-visual sensors and the visual data from the camera from a sensor database;

filtering the data from the one or more non-visual sensors based on a type of the detection, wherein the data from the one or more non-visual sensors comprises weight data, motion sensor data, and seismic data, by:

determining one or more overlapping time ranges of data from the one or more non-visual sensors that each indicate a detection of movement;

in response to determining the one or more overlapping time ranges of data from the one or more non-visual sensors that each indicate the detection of movement, comparing the overlapping time ranges of data from the one or more non-visual sensors to time ranges of the visual data stored in the database; and in response to determining that one or more segments of time of the visual data fall within the overlapping time ranges of data from the one or more non-visual sensors, pairing the visual data of the one or more segments of time to the data from the one or more non-visual sensors with the overlapping time ranges.

12. The monitoring system of claim 11, wherein synchronizing the one or more data points of the non-visual data with the one or more frames of the visual data further comprises:

determining a resolution of a frame of the visual data;

determining a brightness of the frame of the visual data; and determining a blurriness of the frame of the visual data.

13. A monitoring system, the monitoring system comprising:

one or more controllers that store instructions that are operable, when executed by the one or more controllers, to cause the one or more controllers to perform operations comprising:

obtaining data from one or more non-visual sensors and a camera from a first monitoring system, wherein the data includes non-visual data from the non-visual sensors and visual data obtained from the camera;

based on the obtained data from the one or more non-visual sensors and the camera, pairing the non-visual data from the one or more non-visual sensors with corresponding visual data from the camera;

based on the pairing from the non-visual data from the non-visual sensors with the corresponding data from the camera, synchronizing one or more data points of the non-visual data with one or more frames of the visual data based on a likelihood of an event indicated in the non-visual data, wherein synchronizing comprises:
   comparing resolution of a frame of the visual data to a first threshold;
   comparing brightness of the frame of the visual data to a second threshold;
   comparing blurriness of the frame of the visual data to a third threshold;
   in response to determining the resolution of the frame falls within a first acceptable range of the first threshold, determining the brightness of the frame falls within a second acceptable range of the second threshold, and determining the blurriness of the frame falls within a third acceptable range of the third threshold, comparing the paired non-visual data corresponding to the frame of the visual data to a voltage threshold; and
   in response to determining the non-visual data exceeds the voltage threshold, labeling the frame of the visual data as object detected;
   providing the synchronized one or more data points of the non-visual data with the one or more frames of the visual data as labeled input to a neural network model to train the neural network model to detect the event; and
   providing the trained neural network model to one or more cameras corresponding to one or more additional monitoring systems to detect the event in the visual data obtained by the one or more cameras.

14. The monitoring system of claim 13, further comprising in response to determining the non-visual data does not exceed the voltage threshold, labeling the frame of the visual data as not detected.

15. The monitoring system of claim 9, wherein the trained neural network model is an object detection model trained using a mixture of data indicating when a movement event occurred and data indicating a non-movement event occurred.

16. The monitoring system of claim 13, further comprising:
   receiving data indicating that the trained neural network model detected movement at the monitored property;
   providing data indicating to an owner of the monitored property that the trained neural network model has detected movement at the monitored property, wherein the data comprises real-time video feed of the detected movement;
   receiving, from a client device of the owner, data indicating that the trained neural network produced an error in detecting the movement at the monitored property, wherein the data comprises a notification from the owner indicating no movement in the real-time video feed, the real-time video feed, and data from the non-visual sensors that has timestamps corresponding to timestamps of the real-time video feed; and
   providing the real-time video feed and the data from the non-visual sensors received from the client device to the trained neural network model to update the trained neural network model for improved detection.

17. At least one non-transitory computer-readable storage medium having stored thereon instructions which, when executed by at least one processor, cause performance of operations comprising:
   obtaining data from one or more non-visual sensors and a camera from a first monitoring system, wherein the data includes non-visual data from the non-visual sensors and visual data obtained from the camera;
   based on the obtained data from the one or more non-visual sensors and the camera, pairing the non-visual data from the one or more non-visual sensors with corresponding visual data from the camera;
   based on the pairing from the non-visual data from the non-visual sensors with the corresponding data from the camera, synchronizing one or more data points of the non-visual data with one or more frames of the visual data based on a likelihood of an event indicated in the non-visual data;
   providing the synchronized one or more data points of the non-visual data with the one or more frames of the visual data as labeled input to a neural network model to train the neural network model to detect the event;
   providing the trained neural network model to one or more cameras corresponding to one or more additional monitoring systems to detect the event in the visual data obtained by the one or more cameras;
   receiving data indicating that the trained neural network model detected movement at the monitored property;
   providing data indicating to a user of the first monitoring system that the trained neural network model has detected movement at the monitored property, wherein the data comprises real-time video feed of the detected movement;
   receiving, from a client device of the user of the first monitoring system, data indicating that the trained neural network produced an error in detecting the movement at the monitored property, wherein the data comprises a notification indicating no movement in the real-time video feed, the real-time video feed, and data from the non-visual sensors that has timestamps corresponding to timestamps of the real-time video feed; and
   providing the real-time video feed and the data from the non-visual sensors indicated by the notification received from the client device to the trained neural network model to update the trained neural network model for improved detection.

18. The at least one non-transitory computer-readable storage medium of claim 17, wherein the non-visual data from the one or more non-visual sensors comprises data values provided by the non-visual sensors, timestamps corresponding to each of the data values, a device ID corresponding to each of the non-visual sensors that provided the data values, a string value of a location for each of the non-visual sensors, and a string value for a type of the non-visual sensors; and
   wherein the visual data from the camera comprises video stream data, a device ID of the camera that provided the video stream data, a timestamp of the video stream data, and data indicating a location of the camera in the first monitoring system.

19. The at least one non-transitory computer-readable storage medium of claim 17, wherein pairing the non-visual data from the one or more non-visual sensors with the corresponding visual data from the camera further comprises:
   retrieving the non-visual data from the one or more non-visual sensors and the visual data from the camera from a sensor database;
   filtering the data from the one or more non-visual sensors based on a type of the detection, wherein the data from the one or more non-visual sensors comprises weight data, motion sensor data, and seismic data, by:

determining one or more overlapping time ranges of data from the one or more non-visual sensors that each indicate a detection of movement;

in response to determining the one or more overlapping time ranges of data from the one or more non-visual sensors that each indicate the detection of movement, comparing the overlapping time ranges of data from the one or more non-visual sensors to time ranges of the visual data stored in the database; and in response to determining that one or more segments of time of the visual data fall within the overlapping time ranges of data from the one or more non-visual sensors, pairing the visual data of the one or more segments of time to the data from the one or more non-visual sensors with the overlapping time ranges.

20. The at least one non-transitory computer-readable storage medium of claim 19, wherein synchronizing the one or more data points of the non-visual data with the one or more frames of the visual data further comprises:

determining a resolution of a frame of the visual data;

determining a brightness of the frame of the visual data; and determining a blurriness of the frame of the visual data.

21. At least one non-transitory computer-readable storage medium having stored thereon instructions which, when executed by at least one processor, cause performance of operations comprising:

obtaining data from one or more non-visual sensors and a camera from a first monitoring system, wherein the data includes non-visual data from the non-visual sensors and visual data obtained from the camera;

based on the obtained data from the one or more non-visual sensors and the camera, pairing the non-visual data from the one or more non-visual sensors with corresponding visual data from the camera;

based on the pairing from the non-visual data from the non-visual sensors with the corresponding data from the camera, synchronizing one or more data points of the non-visual data with one or more frames of the visual data based on a likelihood of an event indicated in the non-visual data, wherein synchronizing comprises:

comparing resolution of a frame of the visual data to a first threshold;

comparing brightness of the frame of the visual data to a second threshold;

comparing blurriness of the frame of the visual data to a third threshold;

in response to determining the resolution of the frame falls within a first acceptable range of the first threshold, determining the brightness of the frame falls within a second acceptable range of the second threshold, and determining the blurriness of the frame falls within a third acceptable range of the third threshold, comparing the paired non-visual data corresponding to the frame of the visual data to a voltage threshold; and in response to determining the non-visual data exceeds the voltage threshold, labeling the frame of the visual data as object detected;

providing the synchronized one or more data points of the non-visual data with the one or more frames of the visual data as labeled input to a neural network model to train the neural network model to detect the event; and providing the trained neural network model to one or more cameras corresponding to one or more additional monitoring systems to detect the event in the visual data obtained by the one or more cameras.

* * * * *